United States Patent [19]
van Manen

[11] 3,982,980
[45] Sept. 28, 1976

[54] CARTRIDGE MAKING METHOD
[75] Inventor: Dick T. van Manen, Canandaigua, N.Y.
[73] Assignee: Voplex Corporation, Pittsford, N.Y.
[22] Filed: June 23, 1975
[21] Appl. No.: 589,698

Related U.S. Application Data
[63] Continuation-in-part of Ser. No. 441,971, Feb. 13, 1974, abandoned.

[52] U.S. Cl. .................... 156/73.5; 156/69; 156/244; 156/264; 156/267; 156/311; 222/327; 264/145; 264/159
[51] Int. Cl.² .......................... B32B 31/20
[58] Field of Search ............ 156/73.5, 69, 264, 282, 156/311, 267, 244; 222/327, 391; 264/145, 159

[56] References Cited
UNITED STATES PATENTS

| | | | |
|---|---|---|---|
| 2,646,906 | 7/1953 | Jones et al. | 222/327 |
| 2,673,374 | 3/1954 | Strahm | 156/69 |
| 2,902,190 | 9/1959 | Hosler | 222/327 |
| 3,189,226 | 6/1965 | Sherbondy | 222/327 |
| 3,297,504 | 1/1967 | Brown et al. | 156/73.5 |
| 3,346,435 | 10/1967 | Beck | 156/69 |
| 3,439,839 | 4/1969 | Schumann et al. | 222/327 |
| 3,690,088 | 9/1972 | Anderson et al. | 156/73.5 |

Primary Examiner—Edward G. Whitby
Attorney, Agent, or Firm—Stonebraker, Shepard & Stephens

[57] ABSTRACT

A cartridge such as a caulking cartridge is formed of extruded and injection molded resin parts assembled and welded together. A resin tube is extruded and cut off in lengths to form cartridge barrels, and single-piece resin end caps and nozzles are injection molded. The barrel cylinders are fed to an assembly station where the end caps and nozzles are fitted over one of the severed ends of the barrel cylinders in concentric registry with the barrel cylinders and are successively welded to the barrel cylinders to form cartridges.

4 Claims, 6 Drawing Figures

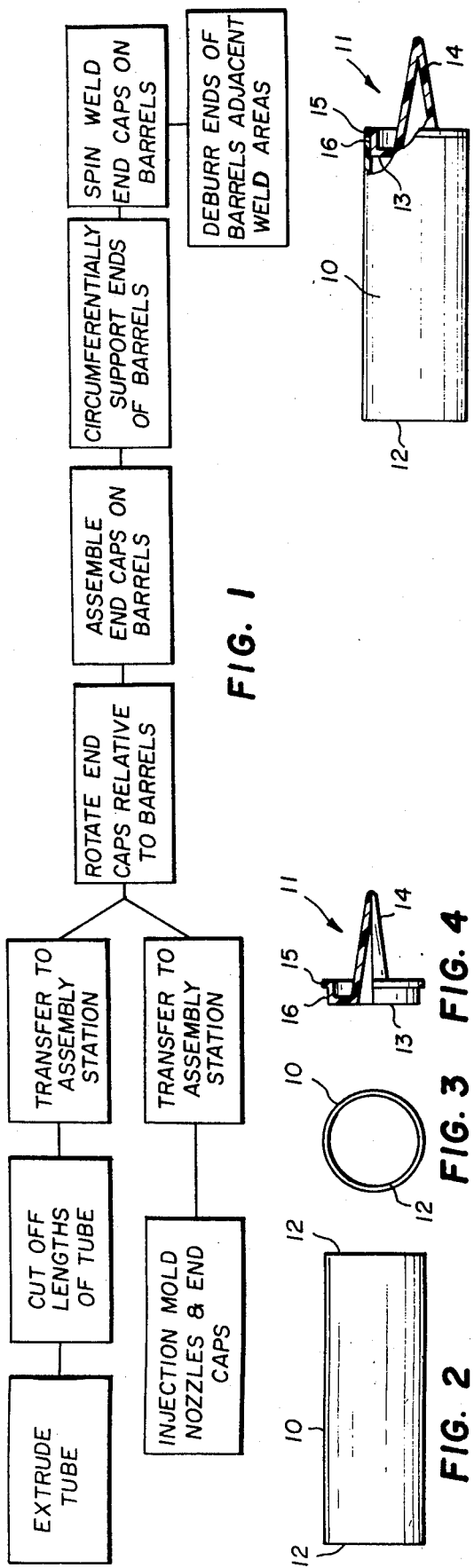
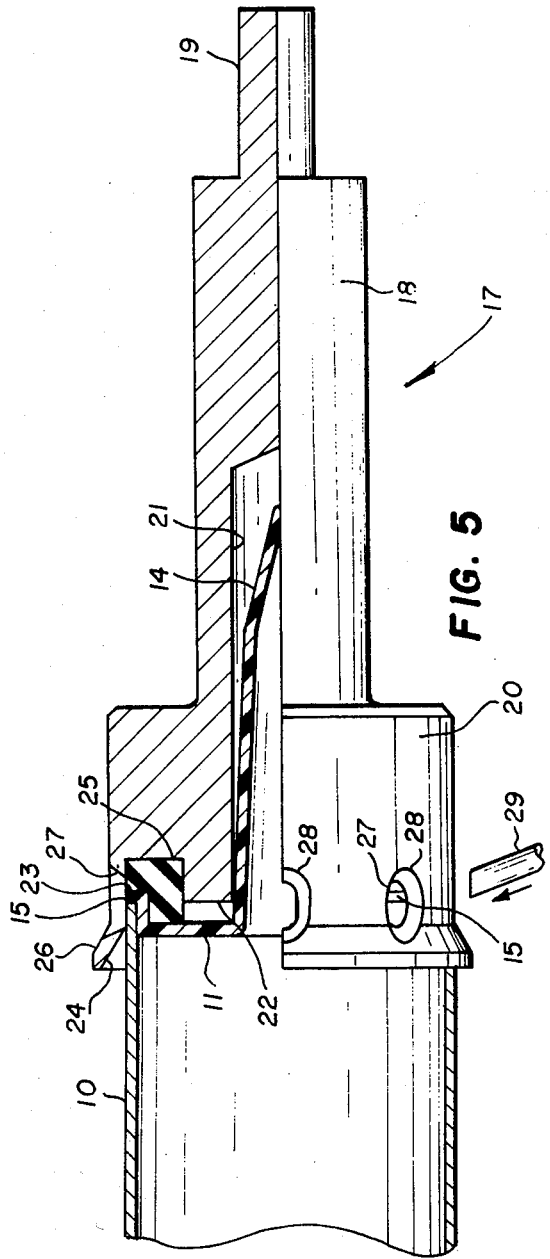

3,982,980

CARTRIDGE MAKING METHOD

RELATED APPLICATIONS

This application is a continuation-in-part of my co-pending application Ser. No. 441,971, CARTRIDGE MAKING METHOD, filed Feb. 13, 1974, and abandoned upon the filing of this application.

THE INVENTIVE IMPROVEMENT

Cartridges to be emptied by pistons moving into the rear ends of the cartridges to force materials out of cartridge nozzles such as for caulking, adhesive application, etc., are popular containers for many materials. Such cartridges in the past have been formed of wound paper tubes having metal end caps, injection molded nozzles, and metal foil seals at the base of the nozzles. They are often wrapped with a printed paper label, and their parts are made by different manufacturers and supplied to an assembler.

The invention involves recognition of the need for a moisture-impervious cartridge for materials that are moisture sensitive or moisture activated, and the invention includes realization of the shortcomings of prior art paper cartridges as to moisture resistance, impact resistance, durability, appearance, and general effectiveness. The invention aims at a way of making a cartridge formed completely of moisture-impervious resin materials for greater strength, impact resistance, durability, and better looks.

SUMMARY OF INVENTION

The invention is a method of making cartridges to be emptied by pistons moving into the rear ends of the cartridges for dispensing materials such as caulking compounds, adhesives, sealants, etc. A resin tube is extruded to have constant inside and outside diameters, and the tube is cut off in equal lengths to provide cylinders forming the barrels of cartridges and having ends evenly severed in planes perpendicular to the longitudinal axes of the cylinders. Single-piece resin end caps and nozzles are injection molded and supplied to an assembly station to which the barrel cylinders are fed. The end caps are fitted successively over the severed ends of the barrel cylinders in concentric registry with the barrel cylinders, and the fitted end caps are welded successively to the severed ends of the barrel cylinders to form cartridges. The resin used for both parts is preferably high-density, moisture-impervious polyethylene, and relative rotation between the barrel cylinders and the end caps is preferably used for spin welding the end caps to the barrel cylinders.

DRAWINGS

FIG. 1 is a schematic block diagram of preferred steps in the inventive method;

FIG. 2 is a side elevational view of a barrel cylinder to be used in the inventive method;

FIG. 3 is an end elevational view of the barrel cylinder of FIG. 2;

FIG. 4 is a partially cross sectional, side elevational view of an end cap and nozzle for use in the inventive method;

FIG. 5 is a partially cross sectional, side elevational view of a tool for holding and supporting an end cap and nozzle and circumferentially supporting a barrel cylinder during the spin welding operation; and FIG. 6 is a partially cut-away, side elevational view of a cartridge made according to the inventive method.

DETAILED DESCRIPTION

Cartridges made by the inventive method are formed of extruded barrel cylinders 10 and injection-molded, single-piece end caps and nozzles 11 which are welded to barrel cylinders 10 to form completed cartridges. Barrel cylinders 10 are formed by extruding a continuous length of relatively thin-walled resin tubing having constant inside and outside diameters, preferably conforming to existing standard sizes for cartridges. The extrusion and cooling of the tubing is preferably controlled to keep the tubing accurately to the desired diameters, and the tubing is cut off in suitable lengths to form cartridge barrels 10. The tubing is preferably formed of high-density, moisture-impervious polyethylene with a thick enough wall to be impact resistant and durable. The contents of the cartridge are then protected from moisture, and the cartridge is relatively resistant to rough handling. Also, its accurate inside diameter provides a good fit throughout its length for the piston used to discharge the contents of the cartridge.

The extruded tubing can be cut off in several generally known ways, including a cutting device that moves with the tubing for making the cut-off on the fly, or a cutting device that momentarily stops the tubing while the cut is made. Either way, the severed ends 12 of barrel cylinders 10 are preferably cleanly cut on planes that are accurately perpendicular to the axes of barrel cylinders 10. This provides smooth and evenly severed ends 12 for each barrel cylinder 10 to facilitate assembly and welding operations.

Meanwhile, end caps and nozzles 11 are injection molded to provide end caps 13 and closed nozzles 14 formed together in a single, injection-molded piece 11. High-density, moisture-impervious polyethylene is also a preferred resin material for injection molding end caps and nozzles 11, and parts 11 are shaped to fit over the ends of barrel cylinders 10 and easier to store than barrel cylinders 10 so they are preferably made in suitable quantities to be matched with barrel cylinders 10 and supplied to an assembly station to which barrel cylinders 10 are fed.

Parts 11 preferably have flanges 15 dimensioned to fit substantially over severed ends 12 of barrel cylinders 10, and cylindrical surfaces 16 dimensioned to fit inside severed ends 12 of cylinders 10. Surfaces 16 are preferably greater in diameter than the inside diameter of cylinders 10 to provide an interference fit therewith. Surfaces 16 are preferably used for locating parts 11 over ends 12 of barrels 10 in accurate, co-axially registry with barrels 10, and with flanges 15 overlying severed ends 12. I have found that because of the interference fit between surfaces 16 and the interior surfaces of barrels 10, the parts can be best assembled if, prior to their engagement, one part is rotated relative to the other, and to this end I prefer to rotate parts 11 and hold barrels 10 against rotation.

A tool shown generally at 17 in FIG. 5 holds parts 11 for rotation relative to barrels 10, and at the same time prevents the outward expansion of barrels 10 adjacent the area of engagement between the barrel cylinders 10 and the end cap and nozzle assemblies 11. Tool 17 comprises a body 18 having a drive spindle 19 of reduced diameter at one end thereof. The opposite end of body 18 is formed with an enlarged cylindrical portion 20 which has a central counter-bore or recess 21 that is substantially the same size and shape as nozzles 14 and is adapted to releasably receive the nozzles therein.

Outwardly of counter-bore 21, bottom surface 22 of portion 20 is formed with a second counter-bore 23 which is adapted to receive the end of barrel cylinders 10 to circumferentially support the end of barrels 10. The outer diameter 24 of counterbore 23 is preferably the same as the outer diameter of barrels 10 so that although tool 17 does not apply any circumferential compressive force on the ends of barrels 10 and is rotating relative to barrels 10, it does circumferentially support the barrels and prevent radial expansion of the same when parts 11 are brought into the ends of the barrels. Since surfaces 16 on parts 11 are greater in diameter than the inside diameter of cylinders 10, the engagement of parts 11 with cylinders 10 would otherwise expand the cylinders in the area adjacent the inter-engagement between the parts. However, I have found that an improved weld is produced if cylinders 10 are restrained against outward radial expansion during the insertion of parts 11 and the subsequent spin welding operation, and this is one of the functions of tool 17.

Tool 17 carries parts 11 with it, and as the tool rotates, so also do parts 11 thereby providing the desired relative rotation between parts 11 and cylinders 10. Tool 17 is preferably provided adjacent counter-bore 23 with an annular driving ring 25 which is of rubber or other elastomeric material and which is shown in FIG. 5 as substantially L-shaped in cross section. Ring 25 transmits the rotary motion of the tool to parts 11. In addition, a quantity of rubber or other similar material may be provided in selected areas in recess 21 for aiding in holding parts 11 in tool 17 and imparting the desired rotary motion thereto.

The free end of portion 20 is provided with an outwardly extending flared portion 26 which aids in guiding the tool over the open end of cylinders 10 to align parts 10 and 11 for the subsequent welding step. Portion 20 is formed with a series of spaced openings 27 that have sharpened inner edges 28 that form rotary cutting and deburring means, for purposes hereinafter described. Openings 27 also allow the passage of air from an air nozzle 29 through tool 17, thereby aiding in the cooling of the tool during successive welding operations.

The welding operation is accomplished by placing a nozzle and end cap part 11 in tool 17, positioning a barrel 10 beneath tool 17, and then the tool is moved towards the barrel to bring part 11 into contact with barrel 10, while tool 17 and part 11 are preferably rotating. Then parts 11 are welded to barrels 10 in one of several ways, the most preferred of which is to continue the rotation of one part relative to the other as by means of rotating tool 17 while pressing the parts together in registered concentric engagement so that the heat produced by the friction of the parts rubbing against each other causes the surfaces to melt and to fuse the parts together in a technique known in other arts as spin welding.

The principle region of the weld between parts 11 and 10 preferably occurs between surfaces 16 and the inner surfaces of barrels 10 that are in engagement with surfaces 16. Because of the interference fit between surfaces 16 and the interior of barrels 10, the relative rotation between the parts quickly generates sufficient heat to soften and melt portions of the surfaces which, upon cooling, fuse together to form a tight seal. The weld between surface 16 and the inside wall of barrel 10 is also strengthened by fusion between severed end 12 of the barrel and flange 15 on the end cap and nozzle assembly 11. End cap and nozzle 11 can also have a cylindrical surface fitting around the outside of barrel cylinder 10, and part 11 can have many different configurations to form end cap 13, nozzle 14, and flange 15 or another surface that engages and is welded to end 12 of barrel 10.

During the above spin welding operation, excess material is melted at the inter-engaging surfaces between parts 11 and 10, and some of this may flow out through the seam between end 12 of cylinder 10 and flange 15 on part 11 which, upon cooling, may form drops or burrs. However, cutting edges 28 formed in openings 27 remove these drops, burrs and any chips that may be formed and produce a smooth outer surface adjacent the weld area between parts 11 and 10. In addition to providing an aesthetically more attractive construction, the removal of the burrs provides a smooth surface which insures that the cartridge will properly fit the holding mechanism in a filling machine. In addition, the removal of the burrs at this point eliminates the possibility of the burrs coming off at a later time and falling into the mass of material to be inserted into the cartridge. Although the deburring operation is a preferred step, it will be appreciated that a satisfactory weld can be obtained without the deburring operation.

A brand name label, instructions, and other information are preferably printed directly on barrel cylinder 10 either before or after parts 10 and 11 are welded together. A finished cartridge made by the inventive method then has a smooth and attractive cylinder 10 with a neat and attractive end cap and nozzle 11 and directly bears labeling, instructions, and any other information without requiring a paper label or outer wrapper. It is thus more attractive than prior art paper cylinders with metal end caps and plastic nozzles. Also, if the preferred, moisture-impervious resin material is used in making the cartridge, no foil seal is required behind the nozzle, and the material packaged in the cartridge is safely protected from leakage of the product or moisture damage to the product without any special coatings, wrappers, seals, or other devices. Also, cartridges made by the inventive method are stronger than prior art paper cartridges and are much more resistant to impact or rough handling. This means that more cartridges will reach the ultimate customer undamaged and containing a product in good quality and ready for use. Also, cartridges made by the inventive method have more accurate barrels so that pistons used to discharge their contents maintain a more accurate fit along the length of the barrel for easier and more complete discharge of the product. Finally, cartridges made by the inventive method are economically competitive with prior art paper cartridges, especially where the advantages of a stronger and more attractive, all-resin cartridge are significant.

The inventive method combines techniques not usually associated in the plastics art, and the inventive method requires ordinarily separated skills to be brought together in a single process to produce a different and advantageous result. Tube extrusion, injection molding of nozzles, and spin welding of plastics parts have all been done in other forms and for other purposes, but their combination in the inventive method achieves significant advantages hitherto overlooked in the art.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate different sizes, shapes, and configurations possible for the resulting cartridge, and the details of the many variations that can be made in the method for producing it.

I claim:

1. A method of making relatively rigid-walled dispenser cartridges, said method comprising:
  a. extruding a generally cylindrical resin tube having a relatively rigid wall with constant inside and outside diameters;
  b. cutting off equal lengths of said tube to provide cylinders for forming the barrels of said cartridges, said cylinders having ends evenly severed in planes approximately perpendicular to the longitudinal axes of said cylinders;
  c. injection molding a quantity of single-piece resin end caps and nozzles each having a cylindrical surface interference fitting the inside surface of said barrel cylinders and each having a flange extending radially outward from said cylindrical surface by approximately the thickness of said wall of said barrel cylinders;
  d. successively feeding said barrel cylinders and said end caps and nozzles to an assembly station;
  e. successively holding said barrel cylinders in place at said assembly station;
  successively holding said end caps and nozzles in a rotatable tool at said assembly station, said rotatable tool having a generally cylindrical surface sized to fit over and encircle the outside surface of said wall of said barrel cylinders;
  g. rotating said rotatable tool and one of said end caps and nozzles relative to one of said barrel cylinders;
  h. moving said rotating tool axially relative to said barrel cylinder to insert said cylindrical surface of said end cap and nozzle into an end region of said barrel cylinder by a sufficient amount to press said flange against said severed end of said barrel cylinder, said movement bringing said cylindrical surface of said tool over said outside surface of said wall of said barrel cylinder for supporting said wall of said barrel cylinder against radial expansion from said interference fit with said end cap and nozzle, and said movement cooperating with said tool rotation to spin weld said cylindrical surface and said flange of said end cap and nozzle respectively to said inside surface and said severed end of said barrel cylinder; and
  i. using said cylindrical surface of said tool for preventing burring of said spin weld.

2. The method of claim 1 including rotating said cylindrical surface with said tool.

3. The method fo claim 2 including using an aperture in said cylindrical surface of said tool for removing any burrs forming from said spin weld.

4. The method of claim 3 including directing air against said tool in the region of said aperture for cooling said tool.

* * * * *